(12) United States Patent
Gomila et al.

(10) Patent No.: US 7,899,113 B2
(45) Date of Patent: Mar. 1, 2011

(54) TECHNIQUE FOR SIMULATING FILM GRAIN ON ENCODED VIDEO

(75) Inventors: Cristina Gomila, Princeton, NJ (US); Jill MacDonald Boyce, Manalapan, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1547 days.

(21) Appl. No.: 10/552,179

(22) PCT Filed: Feb. 24, 2004

(86) PCT No.: PCT/US2004/005365
§ 371 (c)(1),
(2), (4) Date: Oct. 5, 2005

(87) PCT Pub. No.: WO2004/095829
PCT Pub. Date: Nov. 4, 2004

(65) Prior Publication Data
US 2006/0215767 A1    Sep. 28, 2006

Related U.S. Application Data

(60) Provisional application No. 60/462,389, filed on Apr. 10, 2003.

(51) Int. Cl.
*H04N 7/12* (2006.01)
(52) U.S. Cl. .................. 375/240.01; 382/284
(58) Field of Classification Search ................. 382/100, 382/232–253, 254, 260–268, 274–275, 284; 375/240.01–240.29; 430/21–22, 31–32
See application file for complete search history.

(56) References Cited

U.S. PATENT DOCUMENTS

| | | | |
|---|---|---|---|
| 4,935,816 A | 6/1990 | Faber | |
| 5,140,414 A | 8/1992 | Mowry | |
| 5,335,013 A | 8/1994 | Faber | |
| 5,374,954 A | 12/1994 | Mowry | |
| 5,406,326 A | 4/1995 | Mowry | |

(Continued)

FOREIGN PATENT DOCUMENTS

EP    0622000    10/1992

(Continued)

OTHER PUBLICATIONS

Campisi et al., Signal dependent film grain noise generation using homomorphic adaptive filtering, IEEE Proc-Vis Image Signal Process, vol. 147, No. 3, Jun. 2000, pp. 283-287.*

(Continued)

*Primary Examiner*—Sherali Ishrat
(74) *Attorney, Agent, or Firm*—Robert D. Shedd; Robert B. Levy

(57) ABSTRACT

Simulating film grain in an encoded image occurs by extracting the film grain and then characterizing the film grain for encoding in a video stream to enable the film grain restoration upon decoding. Typically, the film grain is characterized based either on the type of film, or by using a particular model. In practice, the film grain particulars are transmitted as parallel information to the video coded stream, typically as a film grain Supplemental Enhancement Information (SEI) message when using the ITU T H.264 video coding standard.

22 Claims, 3 Drawing Sheets

U.S. PATENT DOCUMENTS

| | | | |
|---|---|---|---|
| 5,457,491 | A | 10/1995 | Mowry |
| 5,471,572 | A | 11/1995 | Buchner et al. |
| 5,475,425 | A | 12/1995 | Przyborski et al. |
| 5,629,769 | A | 5/1997 | Cookingham et al. |
| 5,641,596 | A * | 6/1997 | Gray et al. ............... 430/21 |
| 5,687,011 | A | 11/1997 | Mowry |
| 5,709,972 | A | 1/1998 | Cookingham et al. |
| 5,767,860 | A | 6/1998 | Zimmer et al. |
| 5,831,673 | A | 11/1998 | Przyborski et al. |
| 6,327,304 | B1 | 12/2001 | Miller |
| 7,596,239 | B2 * | 9/2009 | Winger et al. ............ 382/100 |
| 7,680,356 | B2 * | 3/2010 | Boyce et al. ............. 382/275 |
| 7,738,722 | B2 * | 6/2010 | Gomila et al. ........... 382/254 |
| 2002/0034337 | A1 | 3/2002 | Shekter |

FOREIGN PATENT DOCUMENTS

| | | |
|---|---|---|
| EP | 1175091 | 1/2002 |
| EP | 1 215 624 A2 | 6/2002 |
| EP | 1215624 | 6/2002 |
| WO | WO9314591 | 7/1993 |
| WO | WO9520292 | 7/1995 |
| WO | WO9722204 | 6/1997 |
| WO | WO0146992 | 6/2001 |
| WO | WO 01/77871 | 10/2001 |
| WO | WO0177871 | 10/2001 |
| WO | WO2004104931 | 12/2004 |

OTHER PUBLICATIONS

McMahon, T. and Gish, W., "High Quality SD & HD AVC Test Results", Joint Video Team (JVT) of ISO/IEC MPEG & ITU-T VCEG (ISO/IEC JTC1/SC29/W G11 and ITU-T SG16 Q.6) JVT-E047, Oct. 2002, URL; http://wftp3.itu.int/av-arch/jvt-site/2002_10_Geneva/JVT-E047-L.doc.

Bjontegaard, G., "Addition of 'comfort noise' as post processing", ITU-Telecommunications Standardization Sector Study Group 16 Video Coding Experts Group Q15-B-15, Aug. 20, 1997, URL; http://wftp3.itu.int/av-arch/video-site/9709_Sun/q15b15.doc.

McLean I et al. "Telecine Nouse Reduction" IEE Seminar Digital Restoration of Film and Video Archives, XX, XX, Jan. 16, 2001, pp. 2-1, XP002285972.

Film Grain Noise Removal and Generation for Color Images, Jacky Chun Kit Yan et al, Dept. Electrical and Computer Eng. University of Toronto 10 Kings College Road, Toronto, Ontario M5S-3G4.

Search Report dated Jul. 27, 2004.

Office Action from U.S. Appl. No. 10/556,834 mailed Aug. 19, 2008.
Office Action from U.S. Appl. No. 10/556,834 mailed Feb. 20, 2009.
Notice of Non-Compliant Amendment from U.S. Appl. No. 10/556,834 mailed Jun. 16, 2009.
Office Action from U.S. Appl. No. 10/569,318 mailed Aug. 15, 2008.
Office Action from U.S. Appl. No. 10/569,318 mailed Feb. 13, 2009.
Office Action from U.S. Appl. No. 10/569,318 mailed Jul. 31, 2009.
Office Action from U.S. Appl. No. 10/572,820 mailed Jun. 1, 2009.
Office Action from U.S. Appl. No. 10/571,148 mailed Apr. 15, 2009.
Office Action from U.S. Appl. No. 10/575,676 mailed Dec. 15, 2008.
Office Action from U.S. Appl. No. 10/575,676 mailed Mar. 13, 2009.
Office Action from U.S. Appl. No. 11/246,848 mailed Jun. 26, 2009.
Office Action from U.S. Appl. No. 11/252,177 mailed May 29, 2008.
Office Action from U.S. Appl. No. 11/252,177 mailed Nov. 5, 2008.
Office Action from U.S. Appl. No. 11/252,177 mailed Apr. 17, 2009.
Office Action from U.S. Appl. No. 11/252,177 mailed Sep. 18, 2009.

Al-Shaykh et al, "Lossy Compression of Images Corrupted by Film Grain Noise," School of Electrical and Computer Engineering, 1996 IEEE.

Al-Shaykh et al, "Restoration of Lossy Compressed Noisy Images," IEEE Transactions on Image Processing, vol. 8, No. 10, Oct. 1999.

Al-Shaykh, "Lossy Compression of Noisy Images," IEEE Transactions on Image Processing, vol. 7, No. 12, Dec. 1998.

Brightwell et al, "Automated Correction of Film Unsteadiness, Dirt and Grain," International Broadcasting Convention, Sep. 16-20, 1994, Conference Publication No. 397, IEE, 1994.

Campisi et al, "Signal-Dependent Film Grain Noise Generation Using Homomorphic Adaptive Filtering," IEE Proceedings, Image Signal Process, vol. 147, No. 3, Jun. 2000.

Zhao et al, "Constant Quality Rate Control for Streaming MPEG-4 Fgs. Video," Integrated Media Systems Center and Department of Electrical Engineering, University of Southern California, 2000 IEEE.

Chavel et al, "Film Grain Noise in Partially Coherent Imaging," Optical Engineering, vol. 19, No. 3, May-Jun. 1980.

Fischer et al, "Image Sharpening Using Permutation Weighted Medians," Department of Electrical Engineering, University of Delaware, fischer@ee.udel.edu, paredesj@ee.udel.edu, arce@ee.udel.edu.

Illingworth et al, "Vision, Image and Signal Processing," The Institution of Electrical Engineers, IEE Proceedings, Jun. 2000, vol. 147, No. 3.

McLean et al, "Telecine Noise Reduction," XP-002285972, 2001 The Institute of Electrical Engineers.

Oktem et al, "Transform Domain Algorithm for Reducing Effect of Film-Grain Noise in Image Compression," Electronics Letters, Oct. 14, 1999, vol. 35, No. 21.

Prades-Nebot et al, "Rate Control for Fully Fine-Grained Scalable Video Coders," Visual Communications and Image Processing 2002, Proceedings of SPIE, vol. 4671 (2002), SPIE 0277-786X/02.

Schaar et al, "Fine-Granularity-Scalability for Wireless Video and Scalable Storage," Visual Communications and Image Processing 2002, Proceedings of SPIE, vol. 4671 (2002) SPIE 0277-786X/02.

Shahnaz et al, "Image Compression in Signal-Dependent Noise," Applied Optics, vol. 38, No. 26, Sep. 10, 1999.

Yan et al, "Efficient Video Coding with Hybrid Spatial and Fine-Grain SNR Scalabilities," Department of Electronic Engineering, Beijing Institute of Technology, China.

Yan et al, "Film Grain Noise Removal and Generation for Color Images," Department Electrical and Computer Engineers, University of Toronto, dimitris@comm.toronto.edu.

Yan et al, "Signal-Dependent Film Grain Noise Removal and Generation Based on Higher-Order Statistics," University of Toronto, Department of Electrical and Computer Engineering, dimitris@comm.toronto.edu, 1997 IEEE.

Yoshida, "Go with the Grain, Film R&D Chief Urges, for Art's Sake," EE Times, Feb. 7, 2005.

Zhang et al, "Constant Quality Constrained Rate Allocation for FGS Video Coded Bitstreams," Visual Communications and Image Processing 2002, Proceedings of SPIE, vol. 4671 (2002) SPIE 0277-786X/02.

Peng et al, "Adaptive Frequency Weighting for Fine-Granularity-Scalability," Visual Communications and Image Processing 2002, Proceedings of SPIE, vol. 4671 (2002) SPIE 0277-786X/02, pp. 840-849.

* cited by examiner

TECHNIQUE FOR SIMULATING FILM GRAIN ON ENCODED VIDEO

This application claims the benefit under 35 U.S.C. §365 of the International Application, PCT/US2004/005365, filed Feb. 24, 2004, which was published in accordance with PCT Article 21(2) on Nov. 4, 2004 in English and which claims the benefit of U.S. provisional patent application No. 60/462,389, filed Apr. 10, 2003.

TECHNICAL FIELD

This invention relates to a technique for simulating the grain of photographic film on a sequence of encoded video.

BACKGROUND ART

The photographic film used to make motion pictures comprises silver-halide crystals dispersed in an emulsion that is deposited in thin layers on a film base. The exposure and development of these crystals form the photographic image, which is made at the largest scale of discrete particles of silver. With color negatives, tiny blobs of dye exist on the sites where the silver crystals form after chemical removal of the silver following development. These small specs of dye form the 'grain' in color film. Grain occurs randomly in the resulting image because of the random formation of silver crystals on the original emulsion. Within a uniformly exposed area, some crystals develop by exposure, others not. Grain varies in size and shape. The faster the film (i.e., the greater the sensitivity to light), the larger the clumps of silver formed and blobs of dye generated, and the more they tend to group together in random patterns. The grain pattern is typically known as 'granularity'.

The naked eye cannot distinguish individual grains, which vary from 0.0002 mm to 0.002 mm. Instead, the eye resolves groups of grains, which the viewer identifies as film grain. The larger the image resolution, the more likely the viewer will perceive the film grain. While clearly noticeable in cinema and high-definition images, film grain progressively loses prominence in Standard Definition Television (SDTV) images and becomes imperceptible in even smaller formats.

Typically, within the domain of video coding, efforts currently exist to improve the performance of the encoder to encode film grain at high bit-rates. Note that, since film grain becomes noticeable only in large image formats such as Standard Definition Television (SDTV), High Definition Television (HDTV) and above, the problem of film grain affects mainly professional encoders.

Present-day studies about film grain have targeted mainly photographic imaging applications (image edition, medical imaging, satellite imagery, astronomy and astrophotography, etc.). There currently exist software applications in the market place (Adobe After Effects, Photoshop, etc.) that provide solutions to this problem. In the domain of video coding, studies have addressed the desirability of removing film grain with the goal of improving the coding performance at mid and low bit-rates. However, the literature contains no specific strategies to encode film grain differently from other high frequency information, such as texture or contours.

In some sense, film grain constitutes the correlated noise inherent in the physical process of developing of photographic film. The presence of film grain denotes 'real-world' images contrast to 'computer-generated' material with no film grain. Images without film grain look like hyper-reality, simply too flat and too sharp to be real. For this reason, film grain remains a desired 'artifact' in most images and video material. However, because film grain arises from a random process affecting high frequencies, the encoding process typically affects film grain. Lossy encoders commonly achieve part of their compression gain by avoiding the transmission of the high frequencies in the DCT domain. Such frequencies are typically associated with noise, sharp edges and texture, but also with the film grain. Even at high bit-rates, film grain becomes difficult to preserve, and always at a high compression cost.

Thus, a need exists to alleviate the cost of encoding film grain without degrading the perceived quality of the displayed image(s).

BRIEF SUMMARY OF THE INVENTION

Briefly, in accordance with present principles, there is provided a method for simulating film grain in an encoded image. The provided method entails film grain extraction and film grain characterization at the encoder to enable the film grain restoration at the decoder. In a preferred embodiment, the method commences by identifying the film grain that is present in an incoming image. Thereafter, the film grain is characterized based either on the type of film, or using a particular model. The incoming image is then encoded and the film grain characterization information transmitted which allows a decoder decoding the encoded image to restore the film grain in accordance with the information transmitted. The method transmits the film grain particulars as parallel information to the video coded stream, typically as a film grain Supplemental Enhancement Information (SEI) message when using the ITU-T H.264 video coding standard.

DETAILED DESCRIPTION

Figure 1:
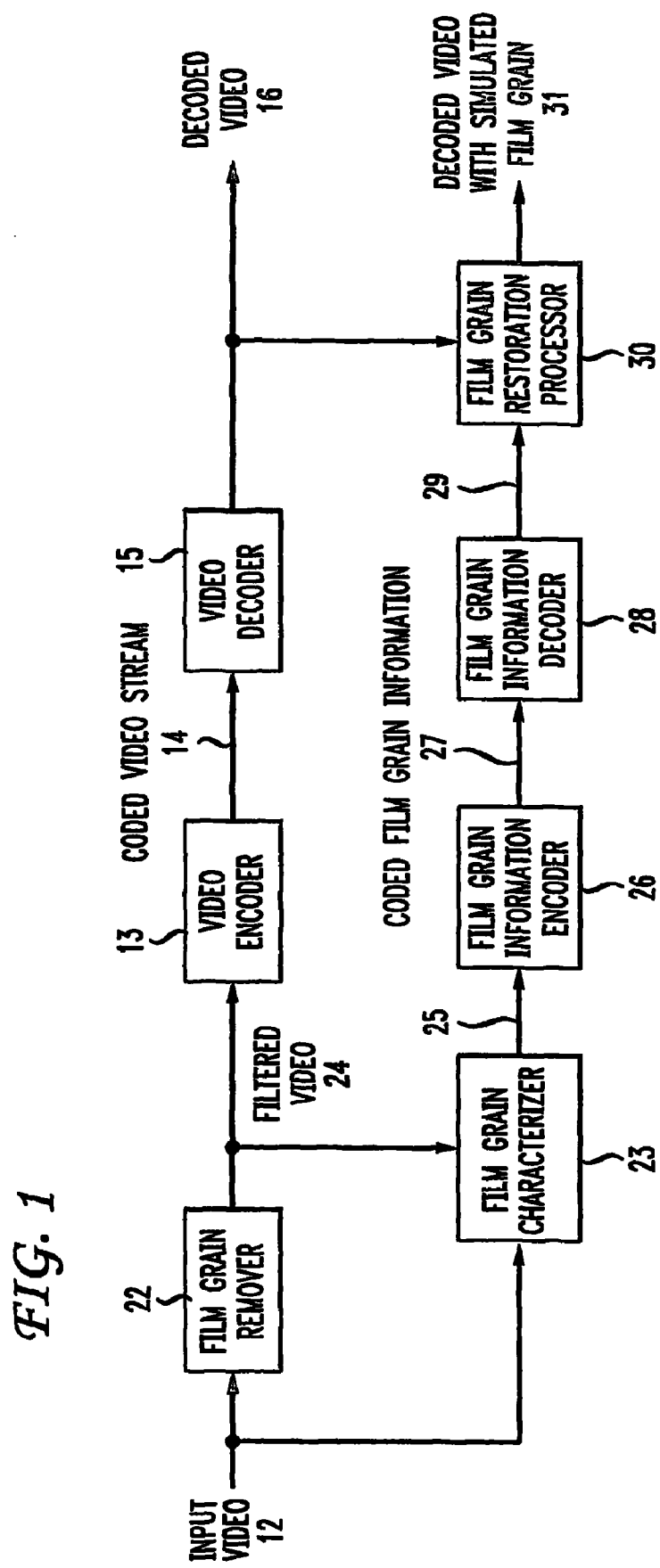
FIG. 1 illustrates a block diagram of a first embodiment of a system in accordance with the present principles for simulating film grain in accordance with the present principles.

Different types of motion picture film have different film grain patterns well known in the art. Thus, identifying the type of film stock used to record the original source material allows identification of the film grain of the encoded material. Table 1 lists an individual numerical identifier for each of a plurality of exemplary film stocks, each having a known film grain pattern.

TABLE 1

| Identifier | Film grain model |
|---|---|
| 0 | Kodak Vision 200T 5274 |
| 1 | Kodak Vision 259D 5246 |
| 2 | Kodak Vision 320T 5277 |
| 3 | Kodak Vision 500T 5279 |
| ... | ... |
| N | Kodak PROFESSIONAL SUPRA 100 |

Knowing the type of film originally used to record the pictures embodied in an encoded video assures optimal quality when restoring the film grain following image decoding. Additional information concerning down-sampling factors that apply to the original image also will prove helpful the film grain restoration at the correct scale. Note that Table I is not intended to be all inclusive but merely exemplary. Other film stocks from other film manufacturers will have separate identifiers.

In the absence of any knowledge of the type of film stock used to record the original source, film grain characterization can occur through a modeling process. The modeling process seeks to reduce the amount of film grain characterization information to be transmitted by providing a compact representation of the film grain pattern and intensity. Such an approach provides an estimate of the original film grain, which can differ from the actual film depending on the selected modeling process. When the system that models the film grain at an encoder is enabled to select among more than one modeling methods to characterize the film grain of the incoming images, a decoder should receive at least some information identifying the modeling method that was selected. In a particular embodiment, the modeling process could provide a compact representation of the film grain according to a non-parametric model. In another embodiment, the modeling process could consist in a parameterization process according to a pre-defined mathematical model. To illustrate this last embodiment, Table 2 provides an example of several different mathematical models could be used to describe film grain.

TABLE 2

| Identifier | Film grain model |
|---|---|
| 0 | f(x, y, c) = d* n |
| 1 | f(x, y, c) = s(x, y, c) + k*s(x, y, c) + d* n |
| 2 | f(x, y, c) = a * f(x − 1, y − 1, c) + b*f(x, y, c − 1) + d*n |
| 3 | f(x, y, c) = a * r(x, y, c) − b*s(x, y, c) + d*n |
| ... | |
| N | f(x, y, c) = a*[d(x − 1, y, c) + f(x, y − 1, c)] + b*f(x, y, c − 1) + d*n |

The use of parametric models requires the transmission of the estimated set of parameters. The parameters will depend on the type of model as specified in Table 2, or in the simplest case, will correspond to a unique film grain model known a priori from the type of film as described in Table 1. The parameters of a given film grain model should allow adjustment of the size of the film grain, its intensity, its spatial correlation, its color correlation, etc. As an example, assume the following formula serves to model the film grain in an image:

$$f(x,y,c)=a*[f(x-1,y,c)+f(x,y-1,c)]+b*f(x,y,c-1)+d*n$$

where f(x,y,c) represents the film grain of the pixel at coordinates (x,y) on the color component c, and n represents a Gaussian noise of mean zero and variance one. According to this model, an encoder should transmit the parameters 'a', 'b' and 'd' to allow a decoder to simulate the original film grain. Note that the parameters of the model could depend on other factors, such as signal intensity, the color component, etc. Hence, transmission of the film grain model parameters actually entails transmission of sets of model parameters for each different case.

FIG. 1 depicts a block schematic diagram of a first embodiment of a system 10 in accordance with the present principles for performing film grain simulation. The system 10 includes a Film Grain Remover 22 that serves to remove the film grain from an input video stream 12 to yield a filtered video stream 24 received at a Video Encoder 13. Film grain removal constitutes a particular case of noise filtering where the noise signal appears correlated with the image signal. Thus, the Film Grain Remover 22 can take the form of a classical image filter, although such a filter will not necessarily provide optimal performance. The Video Encoder 13 encodes the filtered video stream 24 to yield a coded video stream 14 for receipt at a Video Decoder 15 that decodes the coded stream to yield a decoded video stream 16. The Video Encoder 13 and the Video Decoder 15 utilize the same video coding scheme as are well known in the art. For example, the video coding scheme could comprise the ITU-T H.264 video-coding standard, or another type of block-based coding. Encoders and decoders that utilize the MPEG-2 and the ITU-T H.264 standard are well known.

The system 10 also includes a Film Grain Characterizer 23 that receives the input video stream 12 and the filtered video 24 stream. From these video streams, the Film Grain Characterizer 23 outputs film grain characterization information 25. In its simplest implementation, the Film Grain Characterizer 23 characterizes the grain in the input video 12 from a limited set of film grain samples. As an example, film grain samples can be obtained by subtracting the filtered video 24 from the input video 12. In another embodiment, the Film Grain Characterizer 23 can take the form of a look up table that outputs film grain characterization information in accordance with the type of film stock originally used to record the picture embodied in the input video stream 12. Thus, for example, metadata accompanying the input video stream 12 could identify the type of film stock in accordance with Table 1. Using its look-up table, the Film Grain Characterizer 23 will provide the parameters for the identified film, as well as corresponding film grain model for that film. In another embodiment, the Film Grain Characterizer 23 can make use of a film grain modeling process that characterizes the film grain in the input video stream 13 by a set of parameters estimated according to a pre-defined method.

Following the film grain characterization, a Film Grain characterization information Encoder 26 transmits an encoded information stream containing the film grain characterization information to a Film Grain characterization information Decoder 28 in parallel to the encoded video stream 14 transmitted by the Video Encoder 13 to a the Video Decoder 15. Both the Video Encoder 13 and the Film Grain characterization information Encoder 26 use the same encoding scheme. Thus, for example, when the Encoder 26 utilizes the ITU-T H.264 video-coding standard for encoding, the coded film grain characterization information stream 27 can take the form of the film grain Supplemental Enhancement Information (SEI) message as defined in the ITU-T H.264 video coding standard.

The Film Grain characterization information Decoder 28 decodes the coded film grain characterization information stream 27 to yield a decoded film grain characterization information stream 29 for input to a Film Grain Restoration Processor 30. In its simplest form, the Film Grain Restoration Processor 30 takes the form of a pattern adder that blends a film grain pattern with the decoded video stream 16 supplied by the Video Decoder 15 to yield a decoded video stream with simulated film grain 31. In another embodiment, the Film Grain Restoration processor 30 can comprise a pattern generation processor that creates a film grain pattern according to the film grain characterization information in the decoded film grain characterization information stream 29.

Notice that the film grain characterization information can vary dynamically through a video sequence. Thus, different groups of frames can require the transmission of different film grain characterization information. In this way, the Film Grain Restoration processor 30 can update the film grain pattern depending on the transmitted characterization information.

Figure 2:
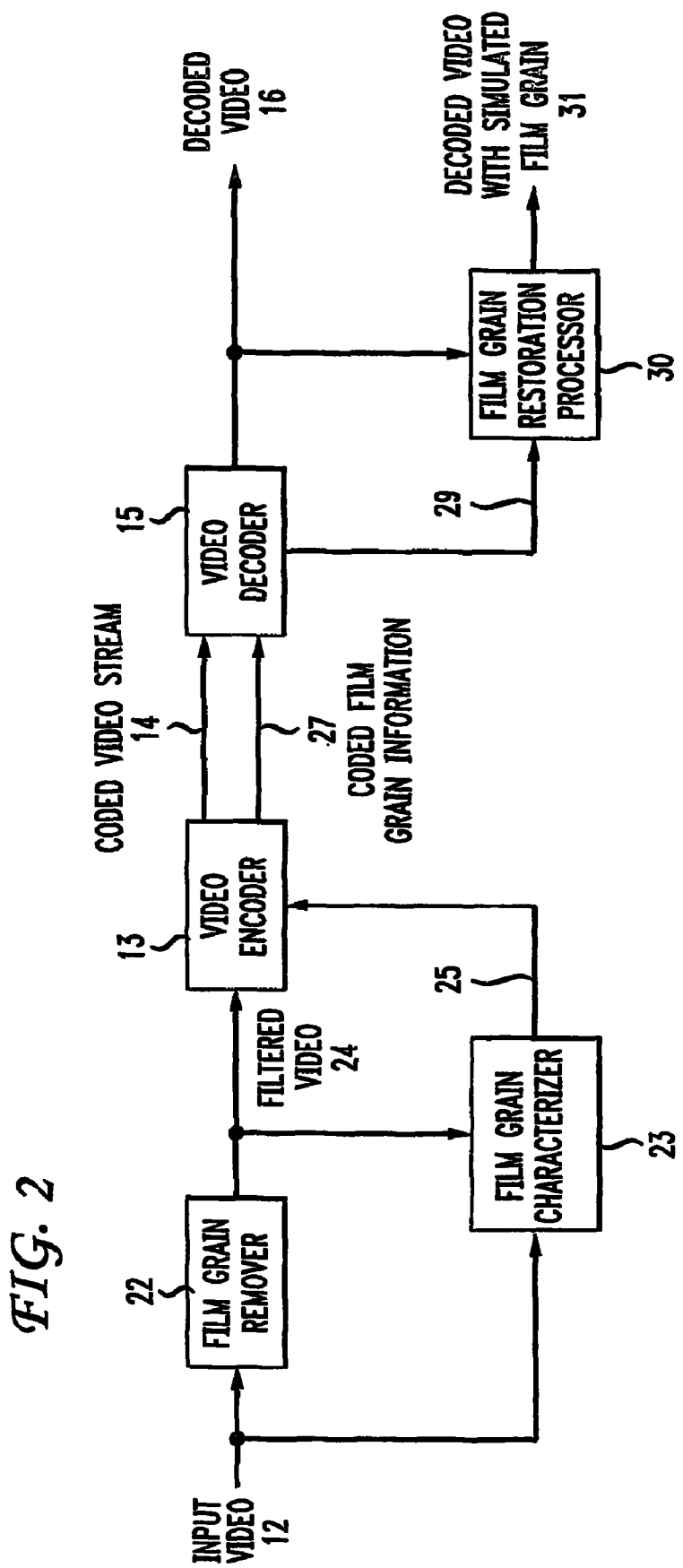
FIG. 2 illustrates a block diagram of a second embodiment of a system in accordance with the present principles for simulating film grain in accordance with the present principles.

FIG. 2 depicts a second embodiment 10' of a system for simulating film grain in accordance with the present principles. The system 10' shares many of the same elements as the system 10 of FIG. 1 and like reference numbers describe like elements. Indeed, the system 10' of FIG. 2 differs only in the absence of the Film Grain characterization information Encoder 26 and Film Grain characterization information Decoder 28 of FIG. 1. The system 10' of FIG. 2 uses the Video Encoder 13 and Video Decoder 15 to encode and decode respectively the film grain characterization information 25 output of the Film Grain Characterizer 23. The system 10' of FIG. 2 requires the use of a video coding standard that supports the transmission film grain characterization information as parallel enhancement information. Thus, for example, when the Video Encoder 13 utilizes the ITU-T H.264 video-coding standard for encoding, the coded film grain characterization information stream 27 can take the form of a Supplemental Enhancement Information (SEI) message as defined in the ITU-T H.264 video coding standard.

Figure 3:
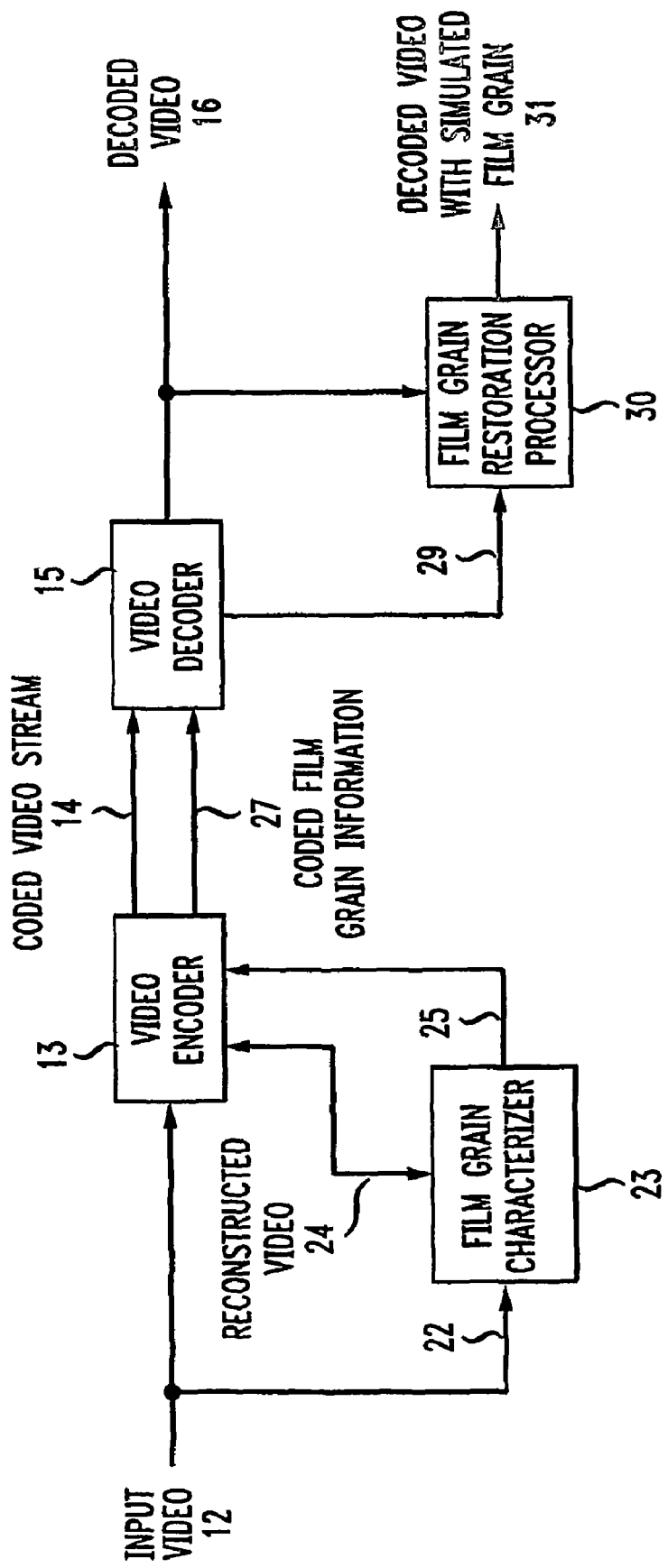
FIG. 3 illustrates a block diagram of a third embodiment of a system in accordance with the present principles for simulating film grain in accordance with the present principles.

FIG. 3 depicts a third embodiment 10" of a system for simulating film grain in accordance with the present principles. The system 10" shares many of the same elements as the system 10' of FIG. 2 and like reference numbers describe like elements. Indeed, the system 10" of FIG. 3 differs only in the absence of the Film Grain Remover 22 of FIG. 2. The system 10" of FIG. 3 uses the reconstructed images available at the Video Encoder 13 to simulate the result of removing film grain. The system 10" of FIG. 3 affords two advantages as compared to the systems 10 of FIGS. 1 and 10' of FIG. 2. First, the system 10" of FIG. 3 reduces the computational complexity related to film grain removal, and secondly, it adapts the film grain characterization to the amount of film grain suppressed by the Video Encoder 13. Once the Film Grain Characterizer of FIG. 3 disposes of both the input video 12 with film grain, and a reconstructed video 24 resulting from Video Encoder 13, it can accomplish the task of characterizing the observed film grain.

In some cases film grain characterization can involve color conversion and/or pixel sample interpolation depending on the original file format. For high quality applications, film grain modeling occurs in the RGB color space, which better approximates the layer configuration of the physical process of film developing. The simplest parametric model can assume the film grain to be a Gaussian noise of zero mean uncorrelated with the image signal. In this case, only the transmission of the standard deviation of the Gaussian function is required. More complicated models can require the transmission of different parameters for each color component and/or for different gray level sets. The choice of a model can be strongly related to the affordable complexity at the decoder side, the number of bits available for encoding the SEI message and mainly the desired quality on display.

In accordance with the present principles, film grain encoding is performed by the step of (a) characterizing the film grain at an encoder, (b) transmitting the film grain characterization information in parallel to the coded video stream and (c) blending the simulated film grain with the decoded video. As discussed, film grain simulation can rely on a predefined model, which reproduces the film grain of a specific type of film, or can occur by parameterization using a mathematic model. In all cases, film grain restoration occurs prior to display. Images with added film grain are never used within the decoding process; however, some parallelization could be possible for causal models.

The foregoing describes a technique for encoding film grain in a video image.

What is claimed is:

1. A method for simulating film grain, comprising the steps of:
   receiving an encoded image (14);
   receiving film grain characterization information (25) indicative of grain in a film on which the encoded image was originally recorded prior to encoding,
   decoding at least the encoded image; and
   simulating a pattern of film grain (29) in accordance with the received film grain characterization information.

2. The method according to claim 1 further comprising the steps of:
   receiving the encoded image (14) in an ITU-T H.264 video coding format; and
   receiving the film grain characterization information (25) as a Supplemental Enhancement Information (SEI) Message.

3. The method according to claim 1 wherein the step of receiving the film grain characterization information includes the step of receiving an identifier of which type of film stock was originally used to record the encoded image.

4. The method according to claim 1 wherein the step of receiving the film grain characterization information (25) includes the step of receiving an identifier of a model that best approximates the film grain in the film stock originally used to record the encoded image.

5. The method according to claim 1 wherein the step of receiving the film grain characterization information (25) includes the step of receiving information indicative of film grain size, intensity, spatial correlation, and color correlation.

6. The method according to claim 1 further including the step of separately simulating the pattern of film grain for separate groups of frames in the encoded video.

7. A method for simulating film grain, comprising the steps of:
   encoding an image (12) originally recorded on film;
   identifying the film grain present in the input image prior to encoding; and
   establishing film grain characterization information (25) for the film in accordance with the identified film grain in the image using a predefined modeling process so that upon decoding the encoding image, a pattern of film grain can be simulated in accordance with the film grain characterization information and blended with the decoded image.

8. The method according to claim 7 further comprising the steps of:
   encoding the image (12) in an ITU-T H.264 video coding format; and
   formatting the film grain characterization information (25) as a Supplemental Enhancement Information (SEI) Message.

9. The method according to claim 7 wherein the step of establishing the film grain characterization information (25) includes the step of identifying which type of type of film stock originally recorded the encoded image.

10. The method according to claim 7 wherein the step of establishing the film grain characterization information (25) includes the step of identifying a model that best provides an indication of film grain in the film originally recorded the image.

11. The method according to claim 10 wherein step of identifying the model includes choosing among a best model among a plurality of film grain models.

12. The method according to claim 7 wherein the step of establishing the film grain characterization information (25) includes the step of establishing film grain size, intensity, spatial correlation, and color correlation.

13. The method according to claim 7 further including the step of removing film grain from the image prior to encoding.

14. Apparatus for simulating film grain in an image, comprising of:
   a decoder (15, 28) for receiving an encoded image (12) and for receiving film grain characterization information indicative (25) of grain in a film on which the encoded image was originally recorded and for decoding the image; and
   a film grain restoration processor (30) for simulating a pattern of film grain in accordance with the received film grain parameter information; and for blending the simulated film grain pattern to the decoded image.

15. The apparatus according to claim 14 wherein the decoder receives the film grain characterization information (25) as parallel information to the encoded image.

16. The apparatus according to claim 14 wherein the decoder receives the encoded image (12) in an ITU-T H.264 video coding format; and wherein the decoder receives the film grain characterization (25) information as a Supplemental Enhancement Information (SEI) Message.

17. The apparatus according to claim 14 wherein the film grain characterization information (25) includes an identifier of which type of film stock originally recorded the encoded image to provide an indication of film grain.

18. The apparatus according to claim 14 wherein the film grain characterization information (25) includes an identifier of a model that best provides an indication of film grain in the film originally recorded the encoded image to provide an indication of film grain.

19. The apparatus according to claim 18 wherein the model identifier identifies the best model among a plurality of film grain models.

20. The apparatus according to claim 14 wherein the film grain characterization information (25) includes information indicative of film grain size, intensity, spatial correlation, and color correlation.

21. The apparatus according to claim 14 wherein the film grain restoration process separately simulates the pattern of film grain for separate groups of frames in the encoded video.

22. The method according to claim 1 further comprising the step of blending the simulated film grain pattern (29) with the decoded image (16).

* * * * *